A. S. SPIEGEL.
DISPLAY DEVICE.
APPLICATION FILED JAN. 22, 1913.
1,088,107.
Patented Feb. 24, 1914.
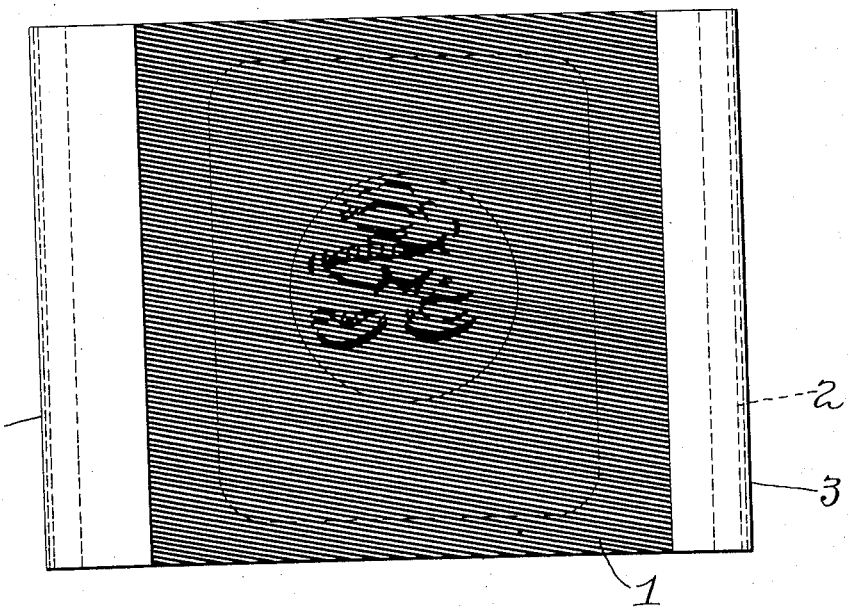
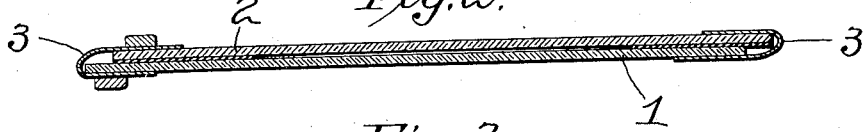
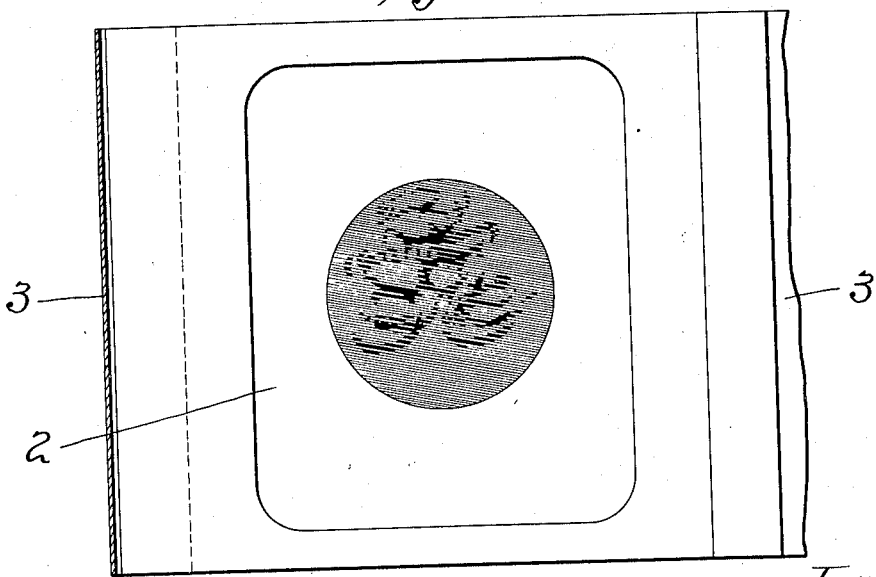
Attest:
Ewd L. Tolson
Chas. F. Calhoun, Jr.
Inventor:
Alexander S. Spiegel,
by Spear, Middleton, Donaldson & Spear
Attys

UNITED STATES PATENT OFFICE.

ALEXANDER S. SPIEGEL, OF CHICAGO, ILLINOIS.

DISPLAY DEVICE.

1,088,107.

Specification of Letters Patent.

Patented Feb. 24, 1914.

Application filed January 22, 1913. Serial No. 743,683.

*To all whom it may concern:*

Be it known that I, ALEXANDER S. SPIEGEL, a citizen of the United States, residing at Chicago, Illinois, have invented certain new and useful Improvements in Display Devices, of which the following is a specification.

My invention relates to display devices such as composite picture slides, picture postcards of the type disclosed in Letters Patent of the United States granted to me December 28, 1909, #949,385, and January 11, 1910, #946,407, for advertising apparatus of the general type in which a screen member having parallel lines or divisions thereon coöperate with a picture-carrying or design-carrying member, the design or picture of which is displayed through the clear spaces between the lines or bars of the screen.

One object of my present invention is to render it possible to use a screen having its lines or bars much finer and much closer together than has been possible heretofore, this fineness of the lines and fineness of the spaces between them being desirable because the lines will not be so noticeable to the eye of the observer, and a further object of the invention is to enable me to operate the display device with good effect and with any desired speed.

The invention is shown in the accompanying drawings, in which—

Figure 1 is a front view of a composite picture slide embodying my invention; Fig. 2 is a sectional view. Fig. 3 is a view of the opposite side of Fig. 1.

In these drawings, 1 is the screen member which may be of various forms, but in one form adapted as a composite picture slide. This screen member is composed of transparent material having the lines of the screen etched or otherwise formed thereon. In rear of this screen member is the design or picture-carrying member 2, and this may have any suitable design or picture marked thereon such, for instance, as is shown in the above mentioned patents where the picture carrying member is formed of lines or groups of lines adapted to appear through the clear spaces between the lines of the screen.

Heretofore the screen member has been formed with its lines extending parallel with each other vertically, and the picture-carrying member was given a movement in a direction at right angles to the lines and clear spaces of the screen. With my present improvement the screen member and the picture-carrying member are so related that the movement of the picture-carrying member is in a direction inclined to the lines of the screen member. I prefer to accomplish this relative movement and arrangement of the screen-carrying member and picture-carrying member by making the lines on the screen member inclined instead of vertical, the inclination being at an angle but a few degrees from horizontal. The picture-carrying member, moving in a horizontal plane, will cause any point thereon to move along a line sharply inclined to the lines of the screen. As a result of this, any given point on the picture-carrying member will have to traverse a greater distance in order to cross one of the clear spaces or to cross one of the lines of the screen than would be the case were its movement directly at right angles to the lines and spaces of the screen member. The greater the lines of the screen member are slanted in relation to the line of movement of the picture or design-carrying member, the longer any particular point on the picture-carrying member will be displayed for a given rate of speed in the relative movement of the picture-carrying member and screen member. As above stated, with the lines of the screen member arranged slanting in relation to the line of relative movement, the screen lines may be made finer and set closer together, and thus be less visible to the eye than if the lines were at right angles to the relative movement of the parts, for it will be observed that in order to get the same length of display between the lines or the same length of shielding effect of the lines with the vertical arrangement, the vertical lines would have to be much farther apart than is the case with the inclined lines.

My invention is, of course, particularly well adapted for composite motion picture slides for use in connection with a lantern adapted to project a picture upon a screen. The two members of the composite picture slide can be secured together by hinge strips 3 at their ends, so that one member will be guided in relation to the other in one direction but held from relative movement in the other direction.

As shown in Fig. 3, the lines making up the picture member are preferably also inclined and at the same angle as the lines of the screen.

I claim as my invention:—

1. A display device consisting of a screen member and a design or picture-carrying member, said members being relatively movable, the screen member having its lines or bars inclined to the direction of relative movement of the members, substantially as described.

2. A display device consisting of a screen member having fine lines or bars thereon inclined slightly from a horizontal plane, and a picture-carrying member, said members having relative movement in a horizontal plane, substantially as described.

3. A display device consisting of a screen member and a design or picture-carrying member, said members being relatively movable, the screen member having its lines or bars inclined to the direction of relative movement of the members and a picture-carrying member having its lines also inclined to the direction of relative movement of the members, substantially as described.

In testimony whereof, I affix my signature in presence of two witnesses.

ALEXANDER S. SPIEGEL.

Witnesses:
W. JAMES,
WM. J. MCKENNA.